United States Patent
Gadwale et al.

(10) Patent No.: US 11,935,036 B2
(45) Date of Patent: Mar. 19, 2024

(54) REDEMPTION AND SETTLEMENT TRANSACTIONS VIA SMART CONTRACTS

(71) Applicant: Capital One Services, LLC, McLean, VA (US)

(72) Inventors: Adithya Gadwale, Falls Church, VA (US); Randolph Lillard, League City, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/595,767

(22) Filed: Oct. 8, 2019

(65) Prior Publication Data

US 2021/0103921 A1    Apr. 8, 2021

(51) Int. Cl.
| | |
|---|---|
| G06Q 30/0226 | (2023.01) |
| G06Q 20/06 | (2012.01) |
| G06Q 20/36 | (2012.01) |
| G06Q 20/40 | (2012.01) |
| G06Q 30/0207 | (2023.01) |
| H04L 9/06 | (2006.01) |

(52) U.S. Cl.
CPC ..... *G06Q 20/3678* (2013.01); *G06Q 20/0658* (2013.01); *G06Q 20/405* (2013.01); *G06Q 30/0215* (2013.01); *G06Q 30/0233* (2013.01); *H04L 9/0637* (2013.01)

(58) Field of Classification Search
CPC ... G06Q 20/36; G06Q 30/0226; H04L 9/0637
See application file for complete search history.

(56) References Cited

U.S. PATENT DOCUMENTS

| | | | |
|---|---|---|---|
| 2013/0124293 A1* | 5/2013 | Peak | G06Q 30/02 |
| | | | 705/14.27 |
| 2016/0125396 A1* | 5/2016 | Brickell | G06Q 20/401 |
| | | | 705/67 |
| 2017/0161728 A1* | 6/2017 | Satyanarayan | G06Q 20/20 |
| 2017/0221085 A1* | 8/2017 | Ghosh | G06Q 30/0205 |
| 2018/0096360 A1* | 4/2018 | Christidis | H04L 9/3239 |
| 2018/0189753 A1* | 7/2018 | Konda | G06Q 20/065 |
| 2018/0253464 A1 | 9/2018 | Kohli et al. | |
| 2018/0268401 A1 | 9/2018 | Ortiz et al. | |

(Continued)

FOREIGN PATENT DOCUMENTS

| | | |
|---|---|---|
| WO | 2017136956 A1 | 8/2017 |
| WO | 2019009913 A1 | 1/2019 |

*Primary Examiner* — Steven S Kim
*Assistant Examiner* — Sima Asgari
(74) *Attorney, Agent, or Firm* — Banner & Witcoff, Ltd.

(57) ABSTRACT

Systems, as described herein, may use smart contracts and distributed ledgers in distributed networks to determine points earned by consumer and settle points for merchants. Distributed ledgers in the distributed network may be used to store transactions executed by merchant digital wallets and consumer digital wallet. Smart contracts in distributed networks may be used to maintain point balances associated with the consumer digital wallets and the merchant digital wallets of the consumer, determine points earned by consumer digital wallets, settle points for merchant digital wallets, and send messages to consumer digital wallets regarding expiring points. Systems, as described herein, may also send individualized recommendations of goods and services to the consumer digital wallets.

20 Claims, 11 Drawing Sheets

(56) References Cited

U.S. PATENT DOCUMENTS

| | | |
|---|---|---|
| 2019/0073666 A1 | 3/2019 | Ortiz et al. |
| 2019/0147708 A1* | 5/2019 | Monaco ............... G06Q 20/065 |
| | | 705/16 |
| 2019/0156363 A1 | 5/2019 | Postrel |
| 2019/0180311 A1* | 6/2019 | Chan .................. G06Q 30/0239 |
| 2019/0188411 A1* | 6/2019 | Kroutik .............. G06F 21/6245 |
| 2020/0258061 A1* | 8/2020 | Beadles ................ H04L 63/102 |

* cited by examiner

REDEMPTION AND SETTLEMENT TRANSACTIONS VIA SMART CONTRACTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to methods and apparatuses for processing transactions in a distributed network, and more particularly is directed to a method for automatically processing transactions in a distributed network via smart contracts.

BACKGROUND

A computing ecosystem may store transactions executed by multiple consumers and merchants. The computing ecosystem may also comprise differing standards, triggers, conditions, and logical rules that are taken into consideration for determining points earned by consumers for the transactions executed by the consumers. The consumers may execute transactions transferring the earned points to one or more merchants or can pool points with other consumers. The points earned by the consumers may be associated with expiration dates, i.e., the consumers may not be able to use the points for other transactions after the expiration date. Some consumers may not be aware of points that are about to expire and may lose the chance to redeem the unused points. Some consumers may want alternative options to execute transactions that require a higher number of points than their current accumulated points would allow.

The computing ecosystem may also comprise logical rules for the merchants for settling points with the organization hosting the computing ecosystem. The settlement between the merchants and the organization may exchange points transferred to the merchants by various consumers for compensation in pre-determined base currency. A pre-determined compensation rate can be used by the computing ecosystem, or the merchants can negotiate a compensation rate with the computing ecosystem depending on the market conditions, the relative strength, and size of the merchants, the number of points being settled, etc. A high number of unsettled points increases the liabilities of the organization.

There may be various challenges encountered and significant resources devoted and/or required in relation to managing and processing points for the consumers and merchants in the computing ecosystem. As a result of technical challenges, such systems have not provided consumers, merchants, and the organization with a robust methodology for processing points which would enable the number of transactions executed by consumers to substantially increase. Accordingly, there is a need for a technically improved architecture for such computing ecosystems.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein generally improve the quality, efficiency, and security of a computer ecosystem determining points earned by consumers and compensation rates for settling points with merchants. The computer ecosystem may use distributed ledgers and smart contracts on a distributed network for storing transactions executed by the consumers and merchants, settling points on behalf of merchants, and rewarding points to consumers based on their executed transactions.

Consumers and merchants participating in the reward program may interact with the system via digital wallets. Distributed ledgers in the distributed networks may store transactions associated with the digital wallets of the participating consumers and merchants.

A smart contract may be maintained in the distributed network for each consumer. Multiple smart contracts may also be maintained for a customer. A smart contract associated with a consumer may maintain a point balance associated with the consumer digital wallet of the consumer. Points in the point balance may be associated with expiration dates. The smart contract may send messages to the consumer regarding points with expiration dates in the near future. The smart contract may maintain a registry of point earning rules associated with the consumer digital wallet. The smart contract may identify a first transaction associated with the consumer digital wallet in the distributed ledger, determine points and an expiration date associated with the points based on the point earning rules in the registry of point earning rules and the first transaction, and execute a second transaction transferring the determined points to the consumer digital wallet.

One or more smart contracts may also be maintained in the distributed network for each merchant. The smart contract may maintain a point balance associated with a merchant digital wallet of the merchant. The smart contract may maintain a registry of point settlement rules associated with the merchant and at a predetermined frequency, execute transactions settling at least a portion of the point balance based on point settlement rules in the registry of point settlement rules.

The system described herein may receive data regarding goods and services available at the one or more merchants and can be purchased with points accumulated by a consumer. The system may analyze transactions in the distributed ledger associated with the digital wallet of the consumer, determine goods and services that may be of interest to the consumers. The system may send a message to the consumer regarding the determined goods and services of interest through digital communication.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
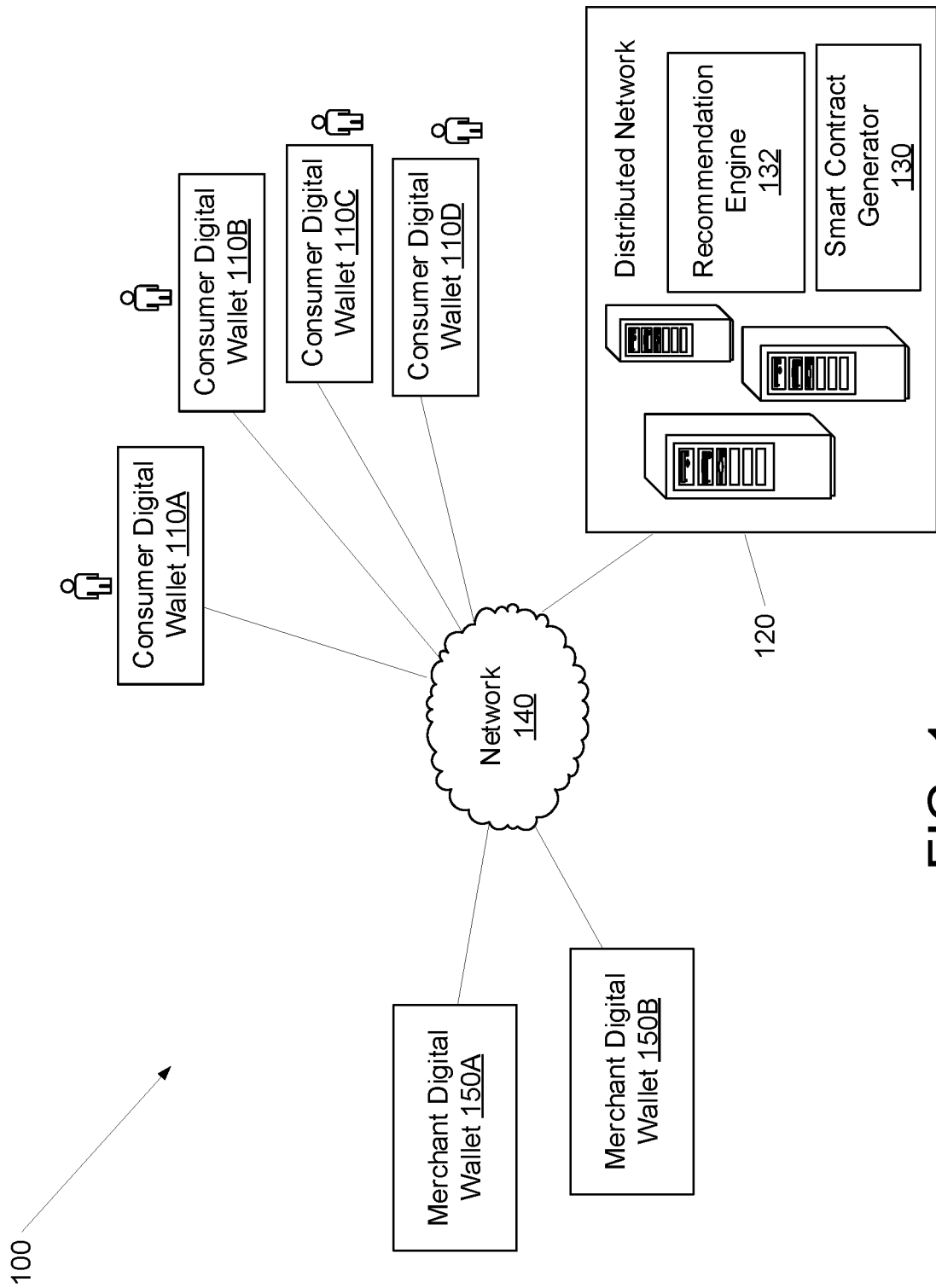
FIG. 1 shows an architectural level schematic of an environment in which one or more aspects described herein may be implemented.

In the following description of the various embodiments, reference is made to the accompanying drawings, which form a part hereof, and in which is shown by way of illustration, various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods, techniques, and infrastructure for processing points in a reward program managed by an organization. The organization may be a credit card issuer, a financial institution, or a merchant. A credit card issuer may prefer that credit card holders or consumers predominantly use that issuer's credit cards in order to generate the largest amount of fees and revenue. Therefore, the credit card issuer may offer incentives to consumers to increase utilization of the card. These incentives may be vigorously promoted by the credit card issuer. The incentives may be in the form of points earned by the consumers by using the credit card issued by the issuer. For example, a consumer can earn 1 point for every $100 spent using a credit card issued by the issuer. The earned points can be redeemed by the consumer for goods and services from merchants participating in the reward program managed by the issuer. For example, 2000 points can be redeemed for a $20 Starbucks gift card.

Similarly, a merchant may manage a reward program and prefer that consumers who are participating in the merchant's reward program shop predominantly at the merchant's online or physical stores. Therefore, the merchant may offer incentives to the consumers to shop at their stores and affiliated partners. The incentives may be in the form of points earned by the consumers by shopping at the merchant. For example, a participant of an airline's reward program can earn 1 point for every mile flown with the airline. The incentives may be advertised by the merchant to the consumers. The earned points can be redeemed by the participants for free goods and services from the merchant. For example, participant of the airline's reward program can redeem 25,000 points for a domestic round trip ticket. The merchant may also collaborate with other merchants to provide a variety of goods and services offered to the participants in exchange for points. For example, the airline company may collaborate with a rental car agency to offer a free rental car for a period of time to the participants of the reward program of the airline company.

Existing reward programs may be implemented in a centralized computer system and may have a number of drawbacks and limitations. The centralized reward system may be vulnerable to attacks by malicious parties. During the attacks, the transactions associated with points in the centralized reward system can be accessed and manipulated by the malicious parties. Furthermore, as a centralized reward system is generally controlled by a single organization, consumers and merchants may be unable to initiate transactions without actions taken by the controlling organization. Therefore, the organization managing the centralized reward system may require complex computing systems to implement the reward program. The organization managing the centralized computing system may also require dedicated call centers with continuous staffing to cater to inquiries and transaction requests from the participating merchants and consumers.

For existing reward programs where points earned by the consumers are associated with expiration dates, some consumers may not be aware of points that are about to expire and may lose the chance to redeem the unused points for free goods and services. Some consumers may need to contact the organization to redeem points and may not be interested in the free goods and services offered in exchange for accumulated points. Some consumers may be interested in goods or services of a higher value that require a higher number of points than their current point balance. Merchants participating in the existing reward programs may also need to contact the organizations to settle points. The merchants may need to actively negotiate the compensation rates for the points they have accumulated with the organization. The negotiation of the compensation rates may be based on the market conditions, the relative strength of the merchants, the number of points being settled, etc. The organization may want to settle points with merchants frequently to eliminate or reduce the financial liabilities of the organization.

Systems for reward programs, as described herein, allow for the implementation of a reward program in a distributed network. A distributed network may be a blockchain network including a decentralized and distributed system that hosts distributed ledgers or blockchains among a set of computer nodes that may record transactions efficiently and in a verifiable and permanent way. The distributed ledgers may comprise blocks of transactions or records and other information pertinent to the blocks. Each block may contain a cryptographic hash and/or a pointer comprising an indication of the previous block, thereby creating a chain of blocks. The pointer may be an address of the previous block and/or a hash pointer comprising a hash of the data inside the previous block. The distributed ledger may create a permanent and unalterable electronic ledger of all transactions which have been written to the ledger since its inception. Transactions may include transaction of consumers associated with credit cards issued by the organization, transactions of consumers at merchants participating in the reward program, transaction of consumers at merchants not participating in the reward program, transaction awarding points to consumers, transactions related to consumers redeeming points for free good and services, transactions related to merchants settling points with the organization, etc. Examples of popular blockchain networks include Ethereum, Eris, Multichain, Bitcoin, Litecoin, Hyperledger Fabric, Credo Blockchain, and Hyperledger Corda. Reward systems, as described herein, may store transactions in a distributed ledger in a blockchain network. The distributed ledger may be stored on a series of decentralized devices acting as nodes, each having a copy of a distributed ledger managed on the node. In some embodiments, the organization may manage a node of the distributed network. In some embodiments, one or more participating merchants may each manage a node in the distributed network.

Transactions in the distributed ledger may be validated by encryption keys of the consumers and/or merchants associated with the transactions. Encryption keys may be uniquely identified and linked to the owner of the encryption keys. Encryption keys may use pairs of keys: (i) public keys which may be disseminated widely, and (ii) private keys which are known only to the owner of the key. Encryption keys also may be electronic or digital signatures comprising a cryptographic mechanism to identify the owners of the signatures.

Each participating consumer and merchant of the reward system may be associated with a digital wallet. A digital wallet is a software program that maintains private keys held by the account holders, and supports the execution of transactions by which users send or receive currency or points, pay for goods and services, earn points, settle points, etc. Numerous digital wallets exist today such as Coinbase™, Bread Wallet™, Mycelium™, Exodus™ Copay™, Jaxx™, Armory™, Trezor™, Ledger Nano™, Green Address™, and Blockchain.Info™. In some embodiments, the reward system may host its own digital wallet.

The digital wallets of the consumers and merchants may comprise a user interface provided by the reward system. The user interface may comprise control commands indicative of requests to execute transactions and process points stored in a digital wallet linked to a consumer or merchant. The user interface may allow a consumer to inquire about the consumer's unused point balance and expiration dates of the points in the point balance. The user interface may allow the consumer to redeem earned points for goods and services. The user interface may allow merchants to inquire about the total number of unsettled points for the merchants and to settle accumulated points. In some embodiments, the user interface may be configured for facilitating queries through conducting one or more traversals of the distributed ledgers.

Reward systems may use smart contracts or digital contracts stored in a distributed network to process points for the participating consumers and merchants. A smart contract may be computer code run by a computer node in the distributed network. The computer code for the smart contract may contain a set of rules under which the parties to that smart contract agree to interact with each other. If and when the pre-defined rules are met, the agreement is automatically enforced. A smart contract may also provide a storage mechanism for storing data related to the smart contract, such as the registries and the point balances described herein. A smart contract may be associated with a smart contract address. The smart contract address may be a unique identifier for a smart contract stored using a blockchain network. In many embodiments, a smart contract address includes an alphanumeric string beginning with the characters "0x".

The reward system may maintain a smart contract (e.g., a consumer smart contract) for a digital wallet of each of its participating consumers. A consumer smart contract may maintain a point balance for the corresponding consumer digital wallet. The consumer smart contract may also maintain records for the expiration dates associated with the points in the point balance. The smart contract may determine points that will expire in the near future, such as a day, a week, or a month, and send a message to the consumer regarding the expiring points. The smart contract may send the message through the digital wallet of the consumer. The smart contract may store contact information of the consumer (e.g., address, phone number, email address, MAC addresses, IP addresses, etc.), and may use the contact information to send a message to the consumer. Informing the consumer by sending messages regarding expiring points may encourage the consumer to redeem the points before they expire.

The consumer smart contract may also maintain a registry of point earning rules associated with the consumer digital wallet. The rules in the registry of point earning rules may specify the criteria for earning points for the consumer. For example, a rule in the registry of point earning rules may indicate than a point is earned for every dollar spent at a merchant or by using a certain credit card.

The reward systems described herein may accommodate multiple incentive programs. For example, a credit card issuer may offer two credit cards with different incentive programs to its consumers. Consumers can earn 1 point per dollar by using the first credit card and 2 points per dollar by using the second credit card. A consumer may participate in both the incentive programs offered by the reward system. A smart contract may be generated for each participating incentive program used by the consumer.

The reward system may maintain a smart contract (e.g., a merchant smart contract) for a digital wallet of each of its participating merchants. A merchant smart contract may maintain a point balance for the corresponding merchant digital wallet. The merchant smart contract may also maintain a registry of point settlement rules associated with the digital wallet of the merchant. The rules in the registry of point settlement rules may specify the compensation rates for settling points for the merchant with the organization managing the reward system. The merchant smart contract may settle points with digital wallets of the organization managing the reward system at a predetermined frequency to eliminate or reduce the financial liabilities of the organization.

An opportunity arises to leverage the transaction data in the distributed ledger and recommendation engines to improve the experience of the consumers by providing individualized recommendations of goods and services to consumers where the recommended goods and services can be obtained by the consumers in exchange for points. Individualized recommendations of goods and services may improve consumer experience and engagement with the reward system. The recommendation engines may use machine learning based models to produce individualized recommendations.

The reward system described herein may improve the functioning of computer systems by securely managing transactions between the organization, consumer digital wallets of the participating consumers and the merchant digital wallets of the participating merchants. The reward system may store the transaction in a distributed ledger, thereby reducing the risk of an unverified third party manipulating the transaction. Additionally, security may be further improved by only allowing access to a distributed ledger and/or blockchain network maintained by the reward system. The reward system may also improve the functioning of computer systems by having a personalized smart contract for all of the participating consumers and merchants. The personalized smart contract reduces the computing burden of the reward system by dividing the task of processing points in the reward system between multiples nodes in the distributed network.

Reward System Implemented on a Distributed Network

FIG. 1 shows an architectural level schematic of a reward system 100 in which one or more aspects described herein may be implemented. The reward system 100 includes a network 140, a distributed network 120, a plurality of consumer digital wallets 110A, 110B, 110C, 110D, and a plurality of merchant digital wallets 150A, 150B. The plurality of consumer digital wallets 110A, 110B, 110C, 110D, and the plurality of merchant digital wallets 150A, 150B are connected to the distributed network 120 through the network 140. In some embodiments, one or more merchant digital wallets of the plurality of merchant digital wallets may be nodes of the distributed network 120. The distributed network may include one or more nodes that store one or more smart contracts for each of the plurality of consumer digital wallets 110A, 110B, 110C, 110D, and the plurality of merchant digital wallets 150A, 150B. The plurality of consumer digital wallets 110A, 110B, 110C, 110D, and the plurality of merchant digital wallets 150A, 150B may interact with the smart contracts in the distributed network 120 through the network 140. One of the nodes of the distributed network 120 may be a smart contract generator 130 configured to generate and maintain smart contracts for the plurality of consumer digital wallets and the plurality of merchant digital wallets participating in the reward system. Another node of the distributed network 120 may be a recommendation engine 132 configured to recommend good and services to the plurality of consumer digital wallets based on transactions stored in the distributed network. In some embodiments, a node of the distributed network may act both as the smart contract generator 130 and the recommendation engine 132.

The communications between the smart contract generator 130, the recommendation engine 132, the plurality of consumer digital wallets 110A, 110B, 110C, 110D, and the plurality of merchant digital wallets 150A, 150B and the other nodes in the distributed network 120 may occur over a variety of network 140, e.g., private networks, VPN, or Internet, and may use appropriate application programming interfaces (APIs) and data interchange formats, e.g., Representational State Transfer (REST), JavaScript™ Object Notation (JSON), Extensible Markup Language (XML), Simple Object Access Protocol (SOAP), Java™ Message Service (JMS), and/or Java Platform Module System. Some of the communications may be encrypted. The network 140 may be a LAN (local area network), a WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, 5G and WiMAX. Additionally, a variety of authorization and authentication techniques, such as username/password, Open Authorization (OAuth), Kerberos, SecureID, digital certificates, and more, may be used to secure the communications. It will be appreciated that the network connections shown in the reward system 100 are illustrative, and any means of establishing a communications link between the computers may be used. Any of the nodes, devices, and systems described herein may be implemented, in whole or in part, using one or more computing systems described with respect to FIG. 2. The data transferred to and from various computing devices in the reward system 100 may include secure and sensitive data, such as confidential documents, customer personally identifiable information, and account data. Therefore, it may be desirable to protect the transmissions of such data using secure network protocols and encryption, and/or to protect the integrity of the data when stored on the various computing devices.

The distributed network 120 may comprise a plurality of nodes that store and/or modify distributed ledgers and have the capability to execute smart contracts as described herein. The distributed ledger in distributed network 120 may store transaction executed by the plurality of consumer digital wallets 110A, 110B, 110C, 110D, and the plurality of merchant digital wallets 150A, 150B. The distributed ledger may also store transaction associated with rewarding points to the plurality of consumer digital wallets 110A, 110B, 110C, 110D, and settling point for the plurality of merchant digital wallets 150A, 150B. A distributed network may be publicly accessible and/or have restricted access. Access to a distributed network may be limited to a particular reward system. The distributed network 120 may comprise one or more distributed ledger data structures comprising a blockchain. This distributed ledger data structure may be replicated among some or all of the nodes in the distributed network 120. Blockchain transactions or records may be time-stamped and bundled into blocks where each block is identified by its cryptographic hash called the consensus proof. The consensus proof may be determined by performing complex cryptographic computations with a consensus algorithm. One skilled in the art would appreciate that, in an implementation, the consensus proof may be determined by any consensus algorithm. The distributed ledger data structure may be a mutation-resistant and durable data structure which maintains records of the blockchain transactions that are tamper-resistant. Once a blockchain transaction is recorded in a block, it cannot be altered or deleted.

In some embodiments, one or more web services or applications may be implemented within the various computing devices. Web services or applications may be accessed by the plurality of consumer digital wallets 110A, 110B, 110C, 110D to execute transactions in the distributed network 120 in the reward system 100 for purchasing goods and services, inquire about point balances, viewing goods and services available in exchange of the earned points, redeeming earned points for goods and services, and receive messages regarding expiring points. Web services or applications may be accessed by the plurality of merchant digital wallets 150A, 150B to execute transactions in the distributed network 120 in the reward system, inquire about point balances, send information to the recommendation engines regarding available goods and services at the merchants, and settling accumulated points. Web services built to support a personalized display system may be cross-domain and/or cross-platform and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in front of one or more computing devices such that any external devices may communicate directly with the specialized hardware.

Some or all of the data and transactions related to the reward system in FIG. 1 may be stored using one or more databases in the distributed network 120. Databases may include but are not limited to relational databases, hierarchical databases, distributed databases, in-memory databases, flat file databases, XML databases, NoSQL databases, graph databases, and/or a combination thereof.

Figure 2:
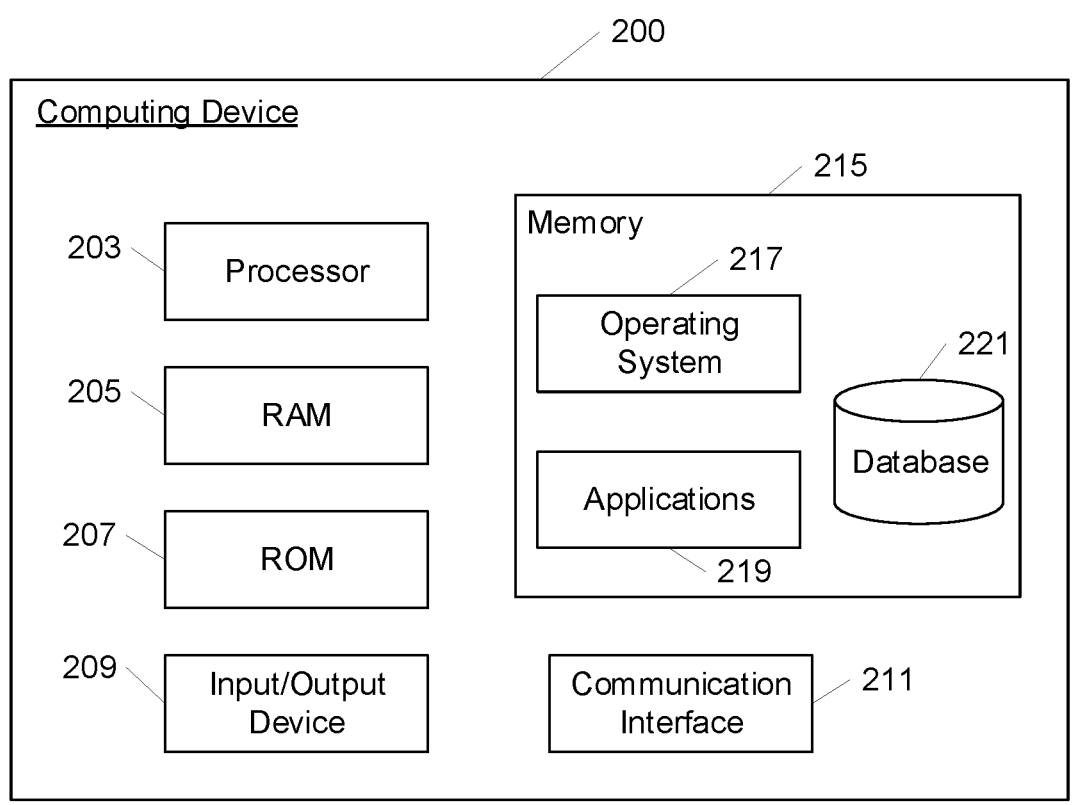
FIG. 2 shows an example computing device in accordance with one or more aspects described herein.

Turning now to FIG. 2, a computing device 200 that may be used with one or more of the computational systems is described. The computing device 200 may include a processor 203 for controlling the overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smartphone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203, allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read-only memory (ROM) 207, electronically erasable programmable read-only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, the functionality of the various components may be combined and/or performed by a single component and/or multiple computing devices in communication without departing from the invention.

Smart Contract Generator

Figure 3:
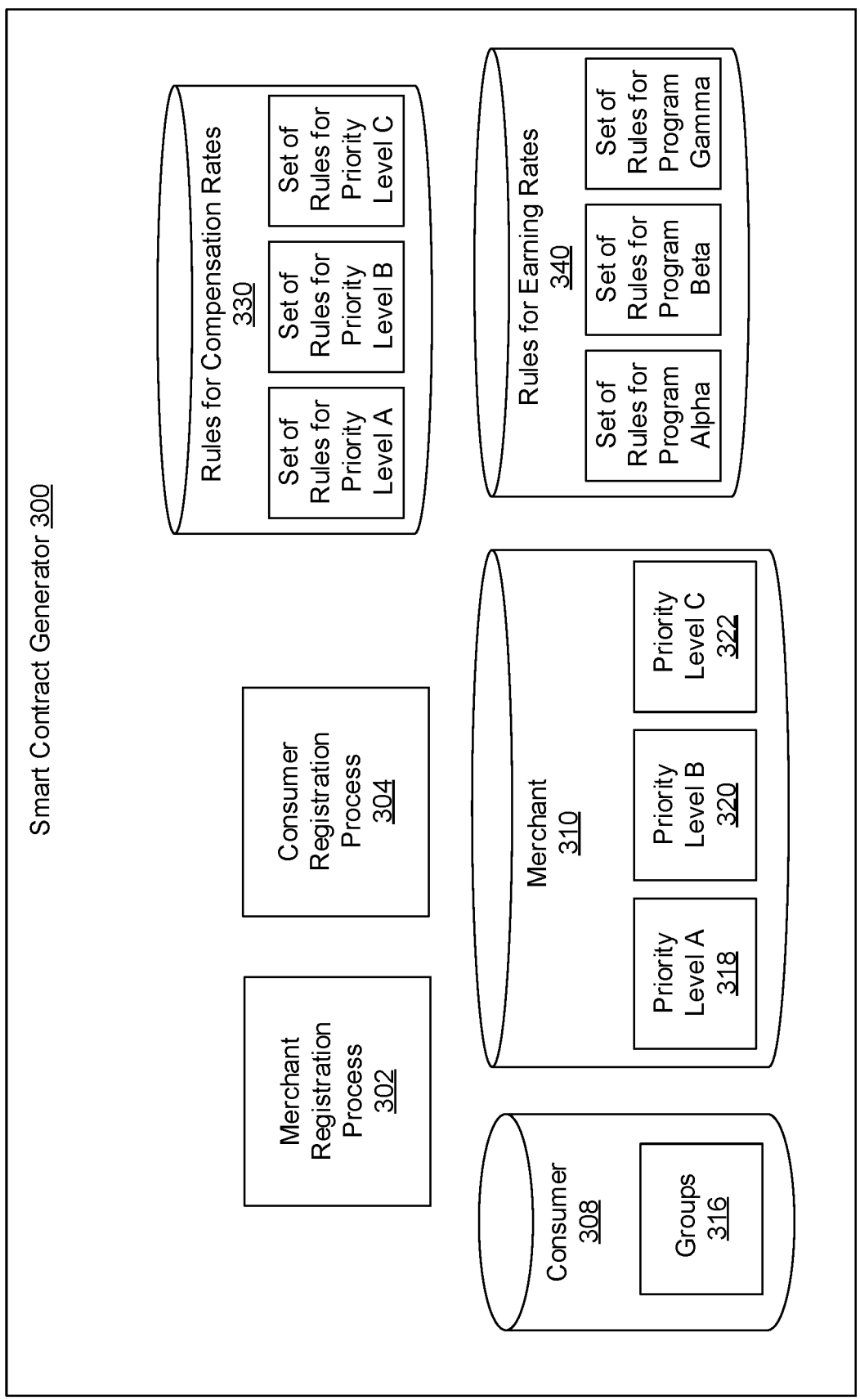
FIG. 3 shows an example of a smart contract generator in accordance with one or more aspects described herein.

FIG. 3 shows an example of a smart contract generator 300 in accordance with one or more aspects described herein. The smart contract generator 300 may include software components referred to herein as a merchant registration process 302 and a consumer registration process monitor 304. The smart contract generator 300 may also include a consumer database 308, a merchant database 310, a database for storing rules for compensation rates 330, and a database for storing rules for earning rates 340.

The database for storing rules for compensation rates 330 may comprise rules that define the underlying logic for determining the compensation rates for merchant digital wallets. A rule may be a conditional statement (e.g., if A and B, then C) that may form of implication between an antecedent (e.g., A and B), and a consequent (e.g., C). Whenever the conditions specified in the antecedents are true, the conditions specified in the consequents must also be true. The antecedents of the rules may define the constraint for a particular compensation rate for the merchant digital wallets. The antecedents of the rules may depend on the priority levels of the merchant digital wallets want, the market conditions during the settlement time, the relative strength and size of the merchant associated with the merchant digital wallet, the number of points being settled, etc.

The rules in the database for rules for compensation rates 330 may be classified into different sets based on priority levels, and strengths and size of the merchants. In some embodiments, the database for rules for compensation rates 330 may maintain a set of rules for each priority levels, such as a first set of rules for the priority level A, a second set of rules for the priority level B and a third set of rules for the priority level C. In some embodiments, the database for rules for compensation rates 330 may maintain subsets of rules within each set of rules where the subsets are associated with the size of the merchant. For example, the first set of rules for the priority level A may have a first subset of rules for merchants that are microenterprises, a second subset of rules for merchants that are small businesses, a third subset of rules for merchants that are medium-sized businesses, and a fourth subset of rules for merchants that are large companies.

The database for storing rules for earning rates 340 may comprise rules that define the underlying logic for determining the earning rates for consumer digital wallets. The antecedents of the rules in the database of rules for earning rates 340 may define the constraint for a particular earning rate for the consumer digital wallets. The antecedents of are rules may depend on incentive programs offered in the reward system. The rules in the database for rules for earning rates 340 may be classified into different sets based on the incentive program. For an embodiment that includes three incentives programs, such as an incentive program alpha, an incentive program beta and an incentive program gamma, the database for rules for earning rates 330 may maintain a set of rules for each incentive program, such as a first set of rules for the incentive program alpha, a second set of rules for the incentive program beta and a third set of rules for the incentive program gamma.

The merchant registration process 302 may process requests from one or more merchant digital wallets to join the reward system. The merchant registration process 302 may generate merchant smart contracts for the merchant digital wallets. Information about the merchant digital wallets may be saved in the merchant database 310. The reward system may have multiple priority levels for the participating merchants of the reward system, such as the priority level A 318, the priority level B 320 and the priority level C 320. The compensation rates for the merchants may be based on the priority levels. For example, the compensation rates of the merchants of the priority level A may be higher than the compensation rates of the merchants of the priority level B, and the compensation rates of the merchants of the priority level B may be higher than the compensation rates of the merchants of the priority level C. The requests from the merchant digital wallets may indicate particular priority levels the merchant digital wallets want to join. The requests may also comprise contact information of the merchants associated with the merchant digital wallets (e.g., address, phone number, email addresses, MAC addresses, IP addresses, physical address, etc.). The contact information may be saved in the merchant database 310.

The merchant registration process 302 may maintain a smart contract template for generating merchant smart contracts where the smart contract template comprises abstract syntax trees (ASTs). ASTs are data structures that may represent the structure of program codes in smart contracts. For example, a function for determining a compensation rate during settlement may be represented as an AST in the smart contract template. The AST may depict the conceptual elements of the program code for determining a compensation rate in a hierarchical tree structure and omit non-essential syntactic details. The hierarchical tree structure of the AST may comprise nodes that indicate elements and its logical occurrence within the program code. The nodes and their relationships may denote assignment statements, control structures, and other essential elements of a program. The program code may be easily manipulated as the modification of an AST does not require the injection of syntactical elements, such as punctuations or delimiters.

The merchant registration process 302 may generate a merchant smart contract by populating the ASTs in the smart contract template by inserting appropriate rules in the appropriate functions in the smart contract. For examples, based on the priority level and/or the size of the merchant associated with the smart contract, the merchant registration process 302 may select a set or a subset of rules from the database storing the rules for compensation rates 330, and populate the AST in the smart contract template with rules from the selected set or subset to form a merchant smart contract for the merchant digital wallet.

The consumer registration process 304 may process requests from one or more consumer digital wallets to join the reward system. The consumer registration process 304 may generate consumer smart contracts for the consumer digital wallets. Information about the consumer digital wallets may be saved in the consumer database 308. The reward system may have multiple incentive programs for the participating consumers of the reward system. The earning rates for the consumers may be based on an incentive program the consumer digital wallet wants to join. A request from a consumer digital wallet may indicate the particular incentive programs the consumer digital wallet wants to join. The request may also comprise contact information of the consumer associated with the consumer digital wallet (e.g., address, phone number, email addresses, MAC addresses, IP addresses, physical address, etc.). The contact information may be saved in the consumer database 308. The request may also comprise information regarding a group of consumer digital wallets where the consumer digital wallet is a member. The group may comprise of the consumer digital wallet and one or more other consumer digital wallets in the reward system as members (e.g., consumer digital wallets in a group may be members of a family or a business). Smart contracts for the consumer digital wallets in the group may be configured to maintain a group point balance where the group point balance is a sum of point balances of all the consumer digital wallets in the group. The information regarding the group 316 may be saved in the consumer database 308.

Similar to the merchant registration process 302, the consumer registration process 304 may maintain a smart contract template for generating consumer smart contracts where the smart contract template comprises ASTs. The consumer registration process 304 may generate a consumer smart contract by populating the ASTs in the smart contract template by inserting appropriate rules in the appropriate functions in the smart contract. For examples, based on the particular incentive program the consumer digital wallet wants to join, the consumer registration process 304 may select a set of rules from the database storing the rules for earning rates 340, and populate the AST in the smart contract template with rules from the selected set or subset to form a consumer smart contract for the consumer digital wallet.

Merchant Smart Contract

Figure 4:
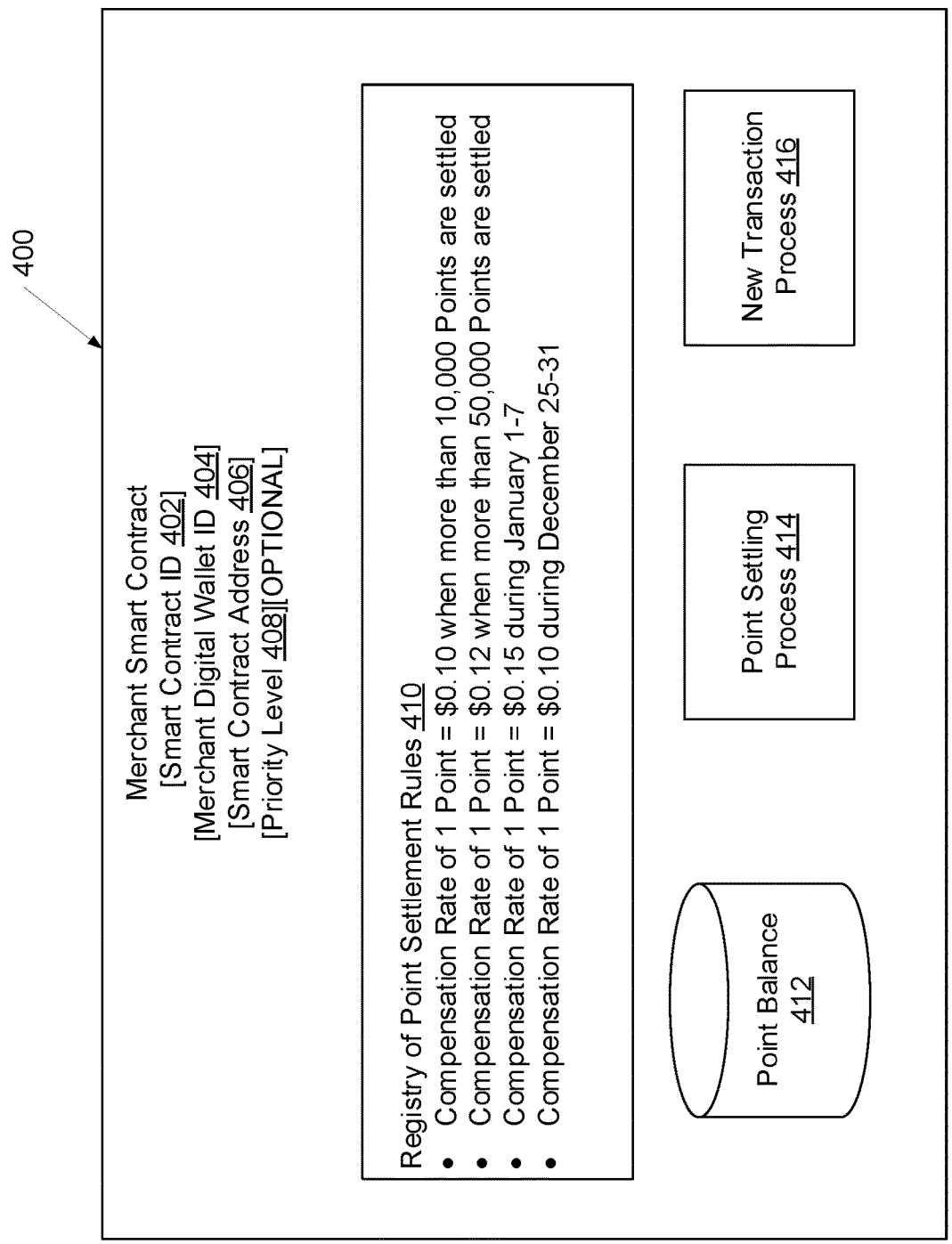
FIG. 4 shows an example of a merchant smart contract in accordance with one or more aspects described herein.

FIG. 4 shows an example of a merchant smart contract 400 in accordance with one or more aspects described herein. The merchant smart contract 400 may be associated with a smart contract ID 402, a merchant digital wallet ID 404 for the merchant digital wallet associated with the merchant smart contract 400, and a smart contract address 406. The smart contract address may be a unique identifier for the smart contract in the blockchain network. In many embodiments, the smart contract address may include an alphanumeric string beginning with the characters "0x". The merchant smart contract 400 may also comprise a priority level 408 associated with the merchant digital wallet.

The merchant smart contract 400 may include software components (e.g., code, instructions, rule sets) referred to herein as a point settling process 414, and new transaction process 416. The merchant smart contract 400 may also include a registry of point settlement rules 410 and a point balance database 412 storing the point balance of the merchant digital wallet associated with the merchant smart contract 400.

The merchant smart contract 400 may comprise contact information of the merchant digital wallet (e.g., address, phone number, email addresses, MAC addresses, IP addresses, etc.). The merchant smart contract 400 may use the contact information to send a message to the merchant digital wallet.

Rules in the registry of point settlement rules 410 may determine the compensation rates for the point balance of the merchant digital wallet when the merchant smart contract 400 settles the point balance. For example, the rules may indicate that 1 point can be exchanged for 10 cents. In some embodiments, the one or more point settlement rules in the registry of point settlement rules 410 may be based on the number of points in the point balance of the merchant digital wallet. For example, a higher number of points in the point balance may result in a higher compensation rate during settlement, such a point balance higher than 10,000 points may result in a compensation rate of 10 cents per point and a point balance higher than 50,000 points may result in a compensation rate of 12 cents per point. Or vice versa, a lower number of points in the point balance may result in a higher compensation rate during settlement, such a point balance higher than 50,000 points may result in a compensation rate of 10 cents per point and a point balance higher than 10,000 points may result in a compensation rate of 12 cents per point. In some embodiments, the point settlement rules in the registry of point settlement rules 410 may be based on the time period when the points will be settled. For example, points settled during the first week of January will receive a higher compensation rate than the compensation rate received the last week of December. In some embodiments, the point settlement rules in the registry of point settlement rules 410 may be based on the priority level 408 of the merchant. For example, a merchant digital wallet associated with a higher priority level may receive higher compensation rate than a merchant digital wallet with a lower priority level.

The new transaction process 416 may identify transactions associated with the merchant digital wallet in the distributed ledger. The transactions may indicate a number of points transferred to the merchant digital wallet by a consumer digital wallet in exchange of goods and services offered by the merchant. The new transaction process 416 may update the point balance based on the transferred points in the identified transactions.

The point settling process 414 may check if requirements to settle points in the point balance are satisfied. The requirements may be that the settlement takes place at a predetermined frequency, the point balance is higher than a predetermined number (e.g., the point settling process 414 initiate the settlement process if the point balance has more than 100,000 points) and/or the compensation rate higher than a predetermined compensation rate (e.g., the point settling process 414 initiate the settlement process if the compensation rate is higher than 10 cents per point). The predetermined frequency can be daily, weekly, biweekly, monthly, quarterly, biannual, and annual.

If the requirements to settle the points in the point balance are satisfied, the point settling process 414 may settle the point by executing transactions to transfer points in the point balance to a digital wallet of the organization managing the reward system and receive monetary compensation in exchange for the points. The compensation rate for the exchange of points between the merchant digital wallet and the digital wallet of the organization may be based on the point settlement rules in the registry of point settlement rules 410.

Consumer Smart Contract

Figure 5:
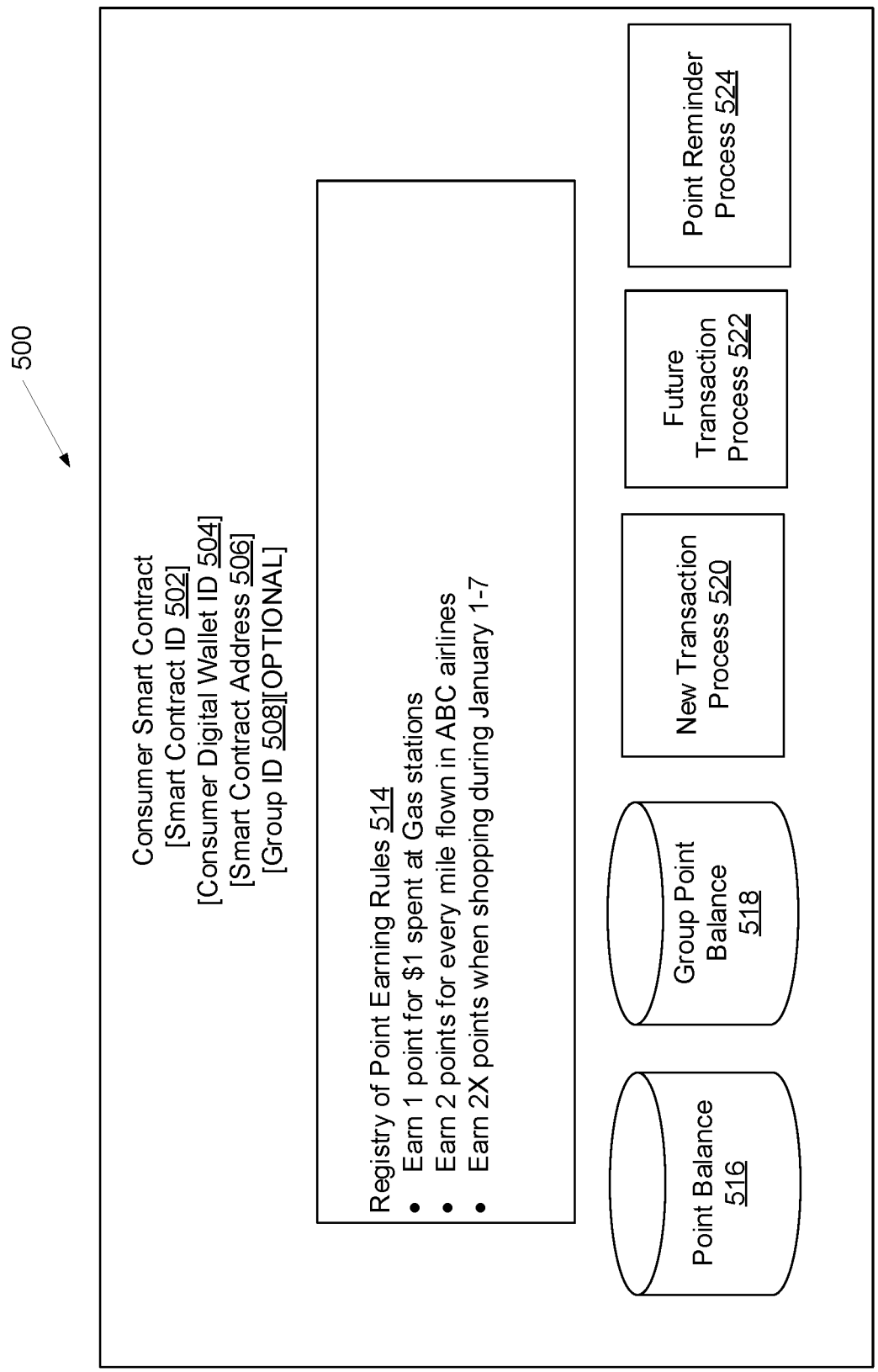
FIG. 5 shows an example of a consumer smart contract in accordance with one or more aspects described herein.

FIG. 5 shows an example of a consumer smart contract 500 in accordance with one or more aspects described herein. The consumer smart contract 500 may be associated with a smart contract ID 502, a consumer digital wallet ID 504 for the consumer digital wallet associated with the consumer smart contract 500, and a smart contract address 506. The smart contract address may be a unique identifier for the consumer smart contract in the blockchain network. In many embodiments, the smart contract address may include an alphanumeric string beginning with the characters "0x". The consumer smart contract 500 may also comprise a group number 508 of a group of consumer digital wallets where the consumer digital wallet is a member.

The consumer smart contract 500 may include software components (e.g., code, instructions, rule sets) referred to herein as a new transaction process 520, future transaction process 522, and a point reminder process 524. The consumer smart contract 500 may also include a registry of point earning rules 514 and a point balance database 516 storing the point balance of the consumer digital wallet associated with the consumer smart contract 500. The consumer smart contract 500 may also include a group point balance database 518.

The consumer smart contract 500 may comprise contact information of the consumer digital wallet (e.g., address, phone number, email addresses, MAC addresses, IP addresses, etc.). The consumer smart contract 500 may use the contact information to send a message to the consumer digital wallet or to the consumer.

Rules in the registry of point earning rules 514 may determine earning rates for earning points through transactions executed by the consumer digital wallet of the consumer smart contract 500 for purchasing goods and services from merchants. For example, the rules may indicate that 1 point can be earned for every dollar spent. The registry of point earning may also comprise rules to determine expiration dates of the earned points. In some embodiments, the one or more earning rules in the registry of point earning rules 514 may be based on the merchant digital wallets associated with the transactions. For example, the exchange rate may be 5 points for every $50 spent on a transaction associated with a merchant digital wallet of a gas station, and the exchange rate may be 10 points for every $50 spent on a transaction associated with a merchant digital wallet of a grocery store. In some embodiments, the point earning rules in the registry of point earning rules 514 may be based on the time period when the transactions took place. For example, points may be earned at a higher exchange rate during the first week of January than during the last week of December.

The point reminder process 524 may determine points in the point balance that will expire in the near future and send a message to the consumer digital wallet regarding the expiring points. The point reminder process 524 may determine points that will expire in a day, a week or a month, and send multiple messages to the consumer digital wallet regarding the expiring points. In some embodiments, the point reminder process 524 may recommend goods or services that can be purchased with the expiring points to the consumer.

The new transaction process 520 may identify a transaction associated with the consumer digital wallet in the distributed ledger. The transactions may indicate a number of dollars transferred to a merchant digital wallet by a consumer digital wallet in exchange of goods and services offered by the merchant. The new transaction process 520 may determine points earned by the consumer digital wallet for the transaction and expiration date associated with the points. The earning rate may be based on the point earning rules in the registry of point earning rules 514.

The future transaction process 522 may receive a request from the consumer digital wallet to execute a transaction if requirements associated with the point balance in the consumer smart contract 500 are satisfied. For example, the consumer smart contract wallet may request to execute a transaction transferring 1000 points to a merchant digital wallet if the point balance has more than 1000 points. The request may indicate a good or service that will be sold to the consumer associated with the consumer digital wallet by the merchant associated with the merchant digital wallet once the transaction is executed. The future transaction process 522 may receive a request from the consumer digital wallet for borrowing points from the organization managing the reward system and execute a transaction based on the borrowed points. The borrowed points may need to be repaid within a certain time period. If the consumer digital wallet does not repay the borrowed points within the time period, the future transaction process 522 may execute a transaction to buy the borrowed points from the organization for the consumer digital wallet.

Registering with the Reward System

Figure 6:
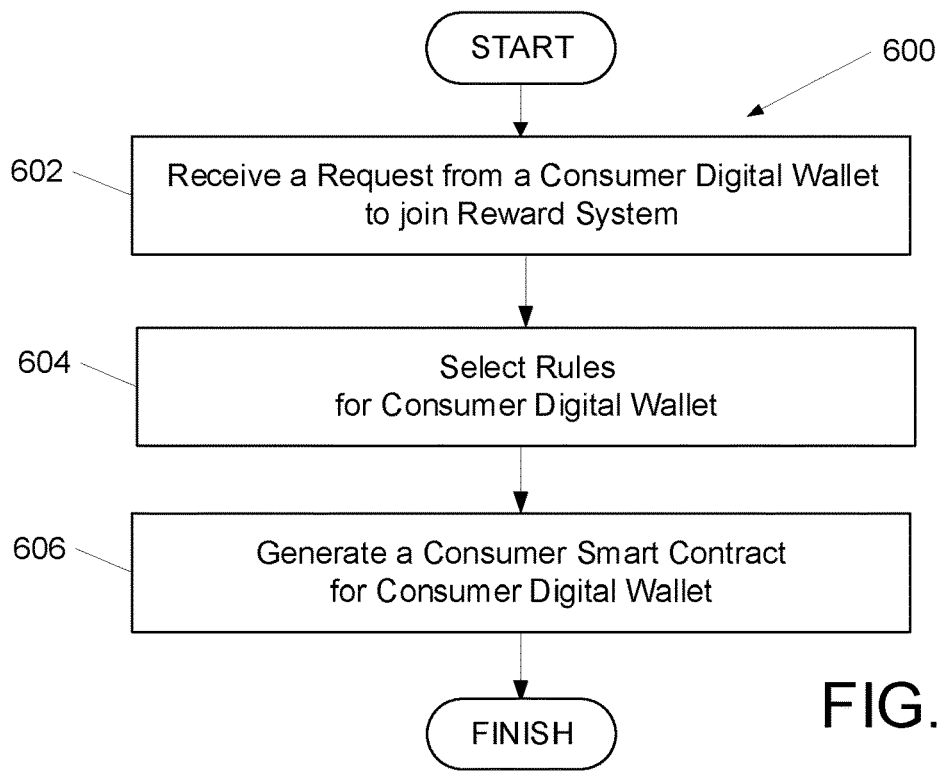
FIG. 6 shows a flowchart of an example process for generating a consumer smart contract according to one or more aspects of the disclosure.

FIG. 6 shows a flowchart 600 of an example process for generating a consumer smart contract by a smart contract generator according to one or more aspects of the disclosure. Some or all of the steps of the flowchart 600 may be performed using by one or more computing devices as described herein. In some embodiments, the actions in the flowchart may be performed in different orders and with different, fewer, or additional actions than those illustrated in FIG. 6. Actions may be combined and/or divided into sub-actions in some implementations.

The flowchart 600 starts at step 602, where a consumer registration process of a smart contract generator may receive a request from a consumer digital wallet to join the reward system. If the reward system manages more than one incentive program, the request may indicate a particular incentive program the consumer digital wallet wants to join. In some embodiments, the consumer digital wallet may request to join more than one incentive programs. The request may also comprise contact information of the consumer associated with the consumer digital wallet (e.g., address, phone number, email addresses, MAC addresses, IP addresses, etc.). The contact information may be used to send messages to the consumer or the consumer digital wallet. The request may also comprise information regarding a group of consumer digital wallets where the consumer digital wallet is a member and share the group point balance with other members of the group.

At step 604, the consumer registration process may select rules for the consumer digital wallet based on the received request at step 602. The consumer registration process may select the rules from the database storing the rules for earning rates where rules may be classified into different sets based on incentive programs offered by the reward system. The consumer registration process may select the rules based on the particular incentive program the consumer digital wallet wants to join as indicated in the received request. At step 606, the consumer registration process may generate a consumer smart contract for the consumer digital wallet based on the received request at step 602. In some embodiments, if the request indicates the desire to join more than one incentive programs, a consumer smart contract may be generated for each of the programs. In some embodiments, a single consumer smart contract may be generated for all the indicated incentive programs. The consumer registration process may maintain a smart contract template for generating consumer smart contracts where the smart contract template comprises ASTs for the registry of point earning rules and the new transaction process. The consumer registration process may generate a consumer smart contract by populating the ASTs in the smart contract template by inserting the rules selected at step 604.

The generated consumer smart contract may be associated with the consumer digital wallet and comprise contact information for the consumer and the consumer digital wallet. The point balance of the generated consumer smart contract may be zero as the consumer smart contract is yet to be used for identifying transaction associated with the consumer digital wallet in the distributed network and keeping a record of points accumulated by the consumer digital wallet based on the identified transactions. In some embodiments, the consumer registration process may transfer a point balance recorded at the consumer digital wallet to the new consumer smart contract. The generated consumer smart contract may comprise a group point balance of a group of consumer digital wallets if the request indicates an intent to join the group.

Figure 7:
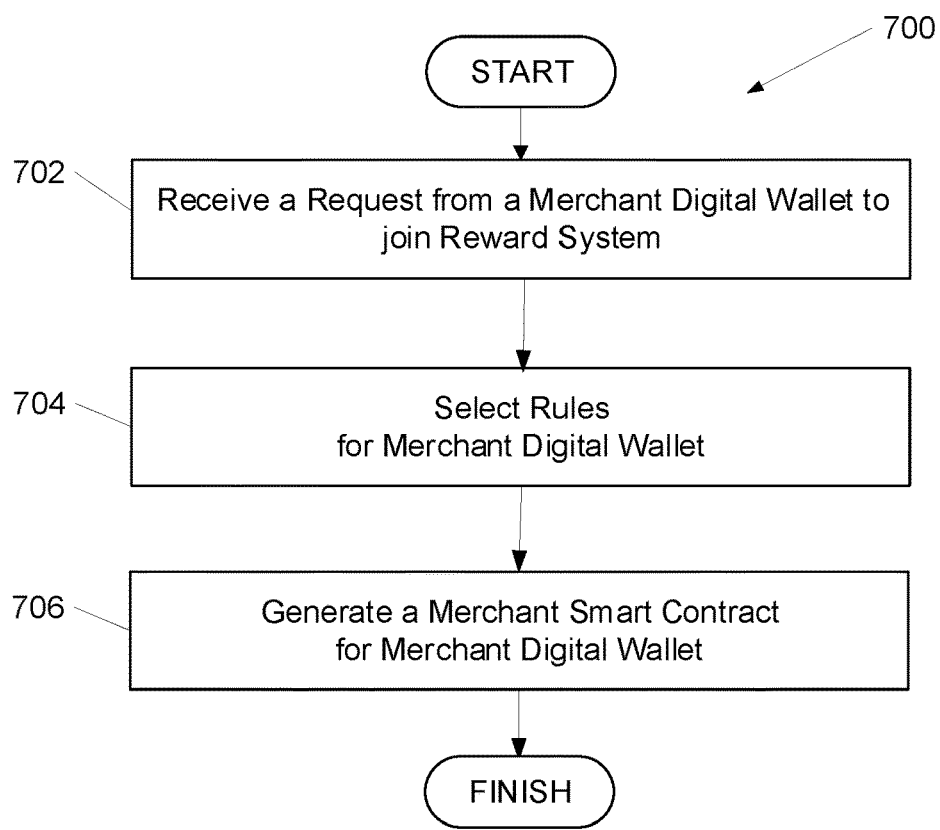
FIG. 7 shows a flowchart of an example process for generating a merchant smart contract according to one or more aspects of the disclosure.

FIG. 7 shows a flowchart 700 of an example process for generating a merchant smart contract according to one or more aspects of the disclosure. Some or all of the steps of the flowchart 700 may be performed using by one or more computing devices as described herein. In some embodiments, the actions in the flowchart may be performed in different orders and with different, fewer, or additional actions than those illustrated in FIG. 7. Actions may be combined and/or divided into sub-actions in some implementations.

The flowchart 700 starts at step 702, where a merchant registration process of a smart contract generator may receive a request from a merchant digital wallet to join the reward system. If the reward system has multiple priority levels for merchants, the request may indicate a particular priority level that the merchant digital wallet wants to join. The request may also comprise contact information of the merchant associated with the merchant digital wallet (e.g., address, phone number, email addresses, MAC addresses, IP addresses, physical address, etc.). The contact information may be used to send messages to the merchant or the merchant digital wallet.

At step 704, the merchant registration process may select rules for the merchant digital wallet based on the received request at step 702. The merchant registration process may select the rules from the database storing the rules for compensation rates where rules may be classified into different sets based on priority levels of merchants. The merchant registration process may select the rules based on the priority level associated with the merchant digital wallet. In some embodiments, the rules may also be selected based on the size of the merchant associated with the merchant digital wallet.

At step 706, the merchant registration process may generate a merchant smart contract for the merchant digital wallet based on the received request at step 702. The merchant smart contract may be associated with the merchant digital wallet and may comprise contact information for the merchant and the merchant digital wallet. The point balance of the new merchant smart contract may be zero as the merchant smart contract is yet to be used for identifying transaction associated with the merchant digital wallet in the distributed network and keeping a record of points accumulated by the merchant digital wallet based on the identified transactions. In some embodiments, the merchant registration process may transfer a point balance recorded at the merchant digital wallet to the new merchant smart contract. The consumer registration process may maintain a smart contract template for generating merchant smart contracts where the smart contract template comprises ASTs for the registry of point settlement rules and the point settling process. The merchant registration process may generate a merchant smart contract by populating the ASTs in the smart contract template by inserting the rules selected at step 704.

Earning and Redeeming Points with the Reward System

Figure 8:
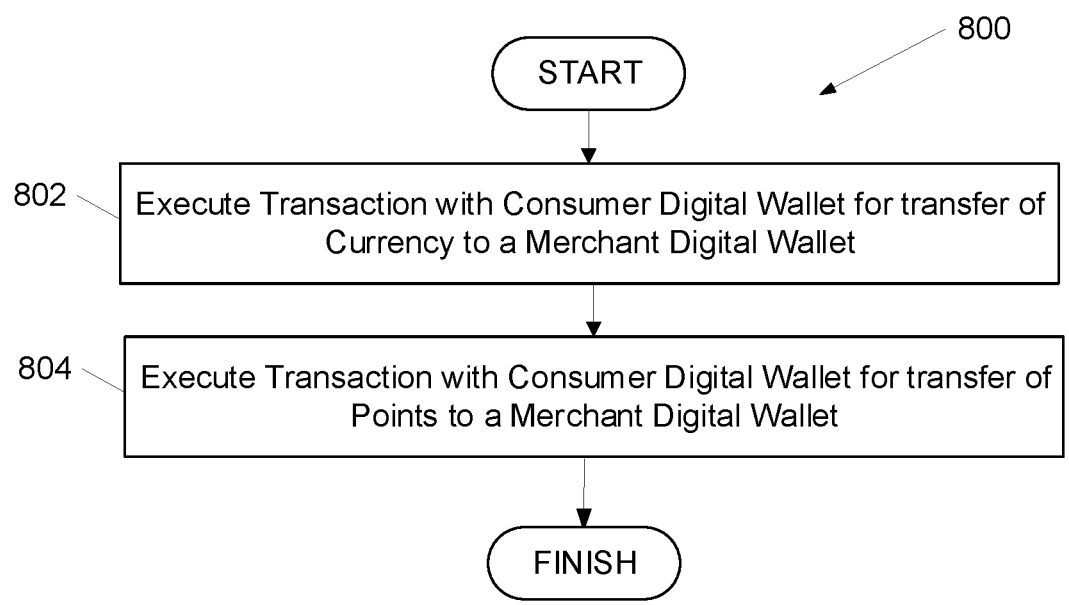
FIG. 8 shows a flowchart of an example process for executing transactions by consumer digital wallets according to one or more aspects of the disclosure.

FIG. 8 shows a flowchart 800 of an example process for executing transactions by consumer digital wallets according to one or more aspects of the disclosure. Some or all of the steps of the flowchart 800 may be performed using by one or more computing devices as described herein. In some embodiments, the actions in the flowchart may be performed with additional actions than those illustrated in FIG. 8. Actions may be combined and/or divided into sub-actions in some implementations.

At step 802 of the flowchart 800, a consumer digital wallet associated with a participating consumer of the reward system may execute a transaction for transferring currency to a merchant digital wallet associated with a merchant. The merchant may be a participating merchant of the reward system. The transaction may be executed for purchasing goods or services from the merchant. The transaction may be validated by one or more nodes of the distributed network and stored in the distributed ledger.

Figure 9:
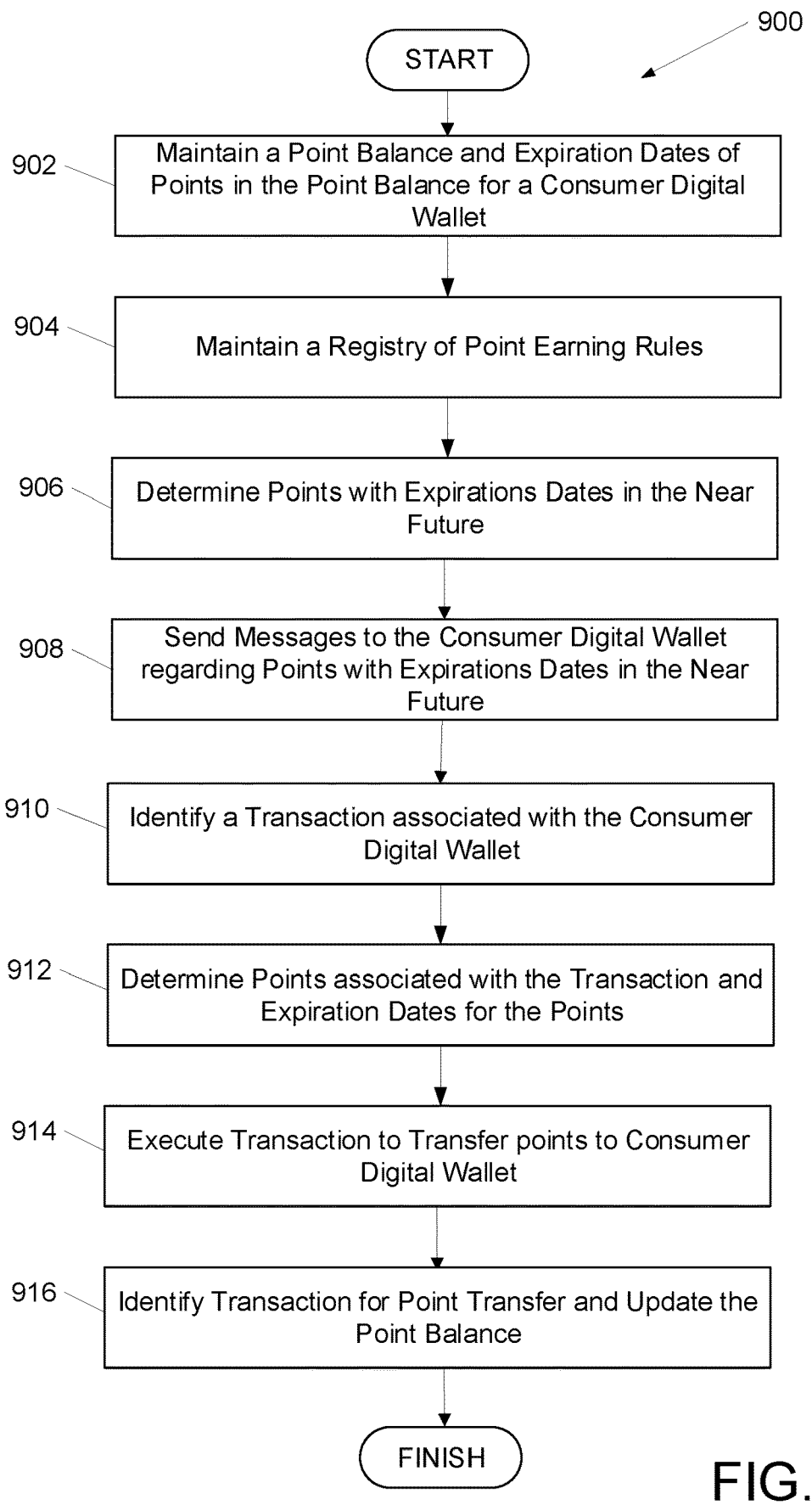
FIG. 9 shows a flowchart of processing points using consumer smart contracts according to one or more aspects of the disclosure.

At step 804, the consumer digital wallet associated may execute a transaction for transferring points from the point balance of the consumer digital wallet to a merchant digital wallet associated with a merchant. The merchant may be a participating merchant of the reward system. The transaction may be executed for redeeming earned points for goods or services from the merchant. The transaction may be validated by one or more nodes of the distributed network and stored in the distributed ledger. FIG. 9 shows a flowchart 900 of processing points using consumer smart contracts according to one or more aspects of the disclosure. Some or all of the steps of the flowchart 900 may be performed using by one or more computing devices as described herein. In some embodiments, the actions in the flowchart may be performed in different orders and with different, fewer, or additional actions than those illustrated in FIG. 9. Actions may be combined and/or divided into sub-actions in some implementations.

The flowchart 900 begins at step 902, a consumer smart contract may maintain a point balance for the consumer digital wallet associated with a participating consumer of the reward system. The point balance may indicate a number of unredeemed points that were earned by the participating consumer of the reward system. Points in the point balance may be associated with an expiration date. For example, 2000 points earned for purchasing an airline ticket may expire a year after the date of earning.

In some embodiments, the consumer smart contract may maintain a group point balance. The consumer digital wallet may be associated with a group. The group may comprise of the consumer digital wallet and one or more other consumer digital wallets in the reward system as members (e.g., consumer digital wallets in a group may be members of a game family or business). Smart contracts for the consumer digital wallets in the group may be configured to maintain a group point balance where the group point balance is a sum of point balances of all the consumer digital wallets in the group. For example, if a consumer digital wallet A having a point balance of 10 points and a consumer digital wallet B having a point balance of 30 points are in a group, the smart contracts for both the consumer digital wallets A and B may maintain a group point balance of 40 points. Any members of the group one one or more primary members of the group may redeem the group point balance for goods and services.

At step 904, the consumer smart contract may maintain a registry of point earning rules. Rules in the registry of point earning rules may indicate earning rates for the transactions executed by the consumer digital wallet of the consumer for purchasing goods and services from merchants. For example, the rules may indicate the 1 point can be earned for every dollar spent. In addition to comprising rules for determining the earning rates, the registry of point earning may also comprise rules to determine the expiration dates of the earned points.

In some embodiments, the one or more earning rules in the registry of point settlement rules may be based on the merchant digital wallets associated with the transactions. For example, the exchange rate may be 5 points for every S50 spent on a transaction associated with a merchant digital wallet of a gas station, and the exchange rate may be 10 points for every $50 spent on a transaction associated with a merchant digital wallet of a grocery store. In some embodiments, the point earning rules in the registry of point settlement rules may be based on the time period when the transactions took place. For example, points may be earned at a higher exchange rate during the first week of January than the exchange rate received during the last week of December.

At step 906, the consumer smart contract may determine points in the point balance that will expire in the near future. The smart contract may determine points that may expire within a predetermined period of time. The predetermined period of time may be a day, a week, or a month.

At step 908, the consumer smart contract may send a message to the consumer digital wallet regarding the expiring points. The smart contract may store contact information of the consumer associated with the consumer digital wallet (e.g., address, phone number, email addresses, MAC addresses, IP addresses, etc.), and may use the contact information to send a message to the consumer. Informing the consumer by sending messages regarding soon to expire points may encourage the consumer to redeem the points before they expire.

At step 910, the consumer smart contract may identify a transaction associated with the consumer digital wallet in the distributed ledger. The transactions may indicate a number of dollars transferred to a merchant digital wallet by a consumer digital wallet in exchange of goods and services offered by the merchant. The smart contract may identify the transactions by identifying transactions associated with the private key or public key of the consumer digital wallet.

At step 912, the consumer smart contract may determine points earned by the consumer digital wallet by executing the transaction identified at step 910. The number of points earned may be determined by an earning rate. The earning rate may be based on the point earning rules in the registry of point settlement rules. The consumer smart contract may also determine the expiration date of the earned points based on the point earning rules in the registry of point settlement rules.

At step 914, the smart contract may execute a transaction to transfer the earned points to the consumer digital wallet. The points may be transferred from a digital wallet of the organization managing the reward system. The execute transaction may comprise an indication of the expiration date of the earned points. The executed transaction may be broadcasted to other nodes in the distributed network for validation by the other nodes in the distributed network.

At step 916, the consumer smart contract may identify the transaction transferring the earned points to the consumes digital wallet in the distributed ledger. The transactions may indicate a number of points transferred to the consumer digital wallet and an expiration date of the points. The consumer smart contract may identify the transactions by identifying transactions associated with the private or public key of the consumer digital wallet. The consumer digital wallet can encrypt the transaction with its private key to gain ownership of the transferred points. The consumer smart contract may update the point balance based on the transferred points in the identified transaction.

Figure 10:
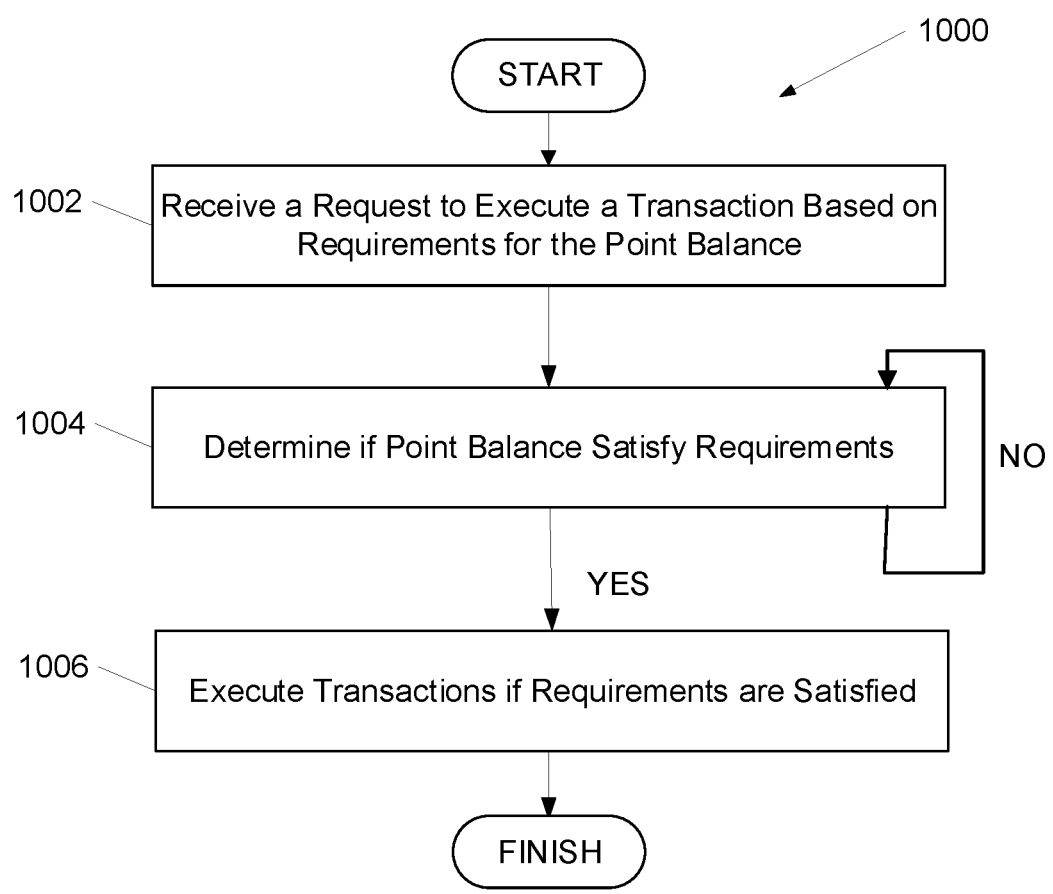
FIG. 10 shows a flowchart of processing transactions based on point balances using consumer smart contracts according to one or more aspects of the disclosure.

FIG. 10 shows a flowchart 1000 of processing transactions based on point balances using consumer smart contracts according to one or more aspects of the disclosure. Some or all of the steps of the flowchart 1000 may be performed using by one or more computing devices as described herein. In some embodiments, the actions in the flowchart may be performed in different orders and with different, fewer, or additional actions than those illustrated in FIG. 10. Actions may be combined and/or divided into sub-actions in some implementations.

The flowchart 1000 begins at step 1002, where a consumer smart contract may receive a request from the consumer digital wallet associated with the consumer smart contract to execute a transaction if requirements associated with the point balance in the consumer smart contract are satisfied. For example, the consumer smart contract wallet may request to execute a transaction transferring 1000 points to a merchant digital wallet if the point balance has more than 1000 points. The request may indicate a good or service that will be sold to the consumer associated with the consumer digital wallet by the merchant associated with the merchant digital wallet once the transaction is executed.

At step 1004, the consumer smart contract may determine if the requirements associated with the point balance of the smart contract is satisfied. For example, the consumer smart contract may determine if the point balance has more than 1000 points. In some embodiments, the smart contract will determine if a group point balance meets the requirements. If the requirements associated with the point balance of the smart contract are not satisfied, step 1004 may be repeated.

At step 1006, if the requirements associated with the point balance of the smart contract are satisfied, the consumer smart contract may execute the transaction. For example, the consumer smart contract may determine the point balance, or the group point balance has more than 1000 points. The executed transaction will transfer points to the merchant digital wallet indicated in the request. The executed transaction may be broadcasted to other nodes in the distributed network for validation by the other nodes in the distributed network.

Settling Points with the Reward System

Figure 11:
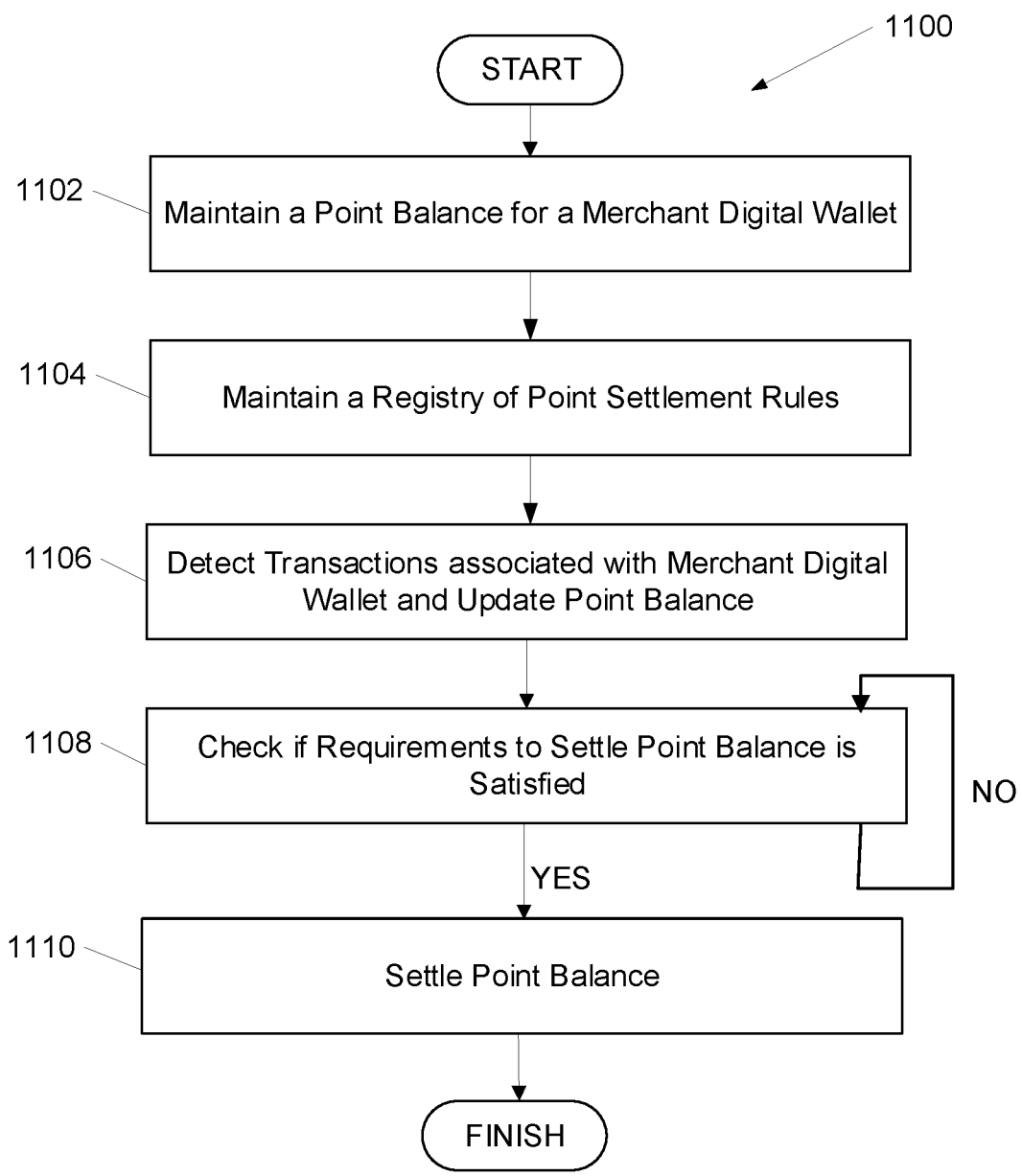
FIG. 11 shows a flowchart of processing points using merchant smart contracts according to one or more aspects of the disclosure.

FIG. 11 shows a flowchart 1100 of processing points using merchant smart contracts according to one or more aspects of the disclosure. Some or all of the steps of the flowchart 1100 may be performed using by one or more computing devices as described herein. In some embodiments, the actions in the flowchart may be performed in different orders and with different, fewer, or additional actions than those illustrated in FIG. 11. Actions may be combined and/or divided into sub-actions in some implementations.

The flowchart 1100 begins at step 1102, where a merchant smart contract may maintain a point balance for the merchant digital wallet associated with a merchant. The point balance may indicate a number of unsettled points that were accumulated when participating consumers of the reward system executed transactions to transfer points to the merchant digital wallet for good and services purchased at the merchant.

At step 1104, the merchant smart contract may maintain a registry of point settlement rules. Rules in the registry of point settlement rules may indicate compensation rates for the point balance of the merchant digital wallet when the smart contract settles the point balance. For example, the rules may indicate the 1 point can be exchanged for 10 cents.

In some embodiments, the one or more point settlement rules in the registry of point settlement rules may be based on the number of points in the point balance of the merchant digital wallet. A higher quantity of points in the point balance may result in a higher compensation rate during settlement. For example, a point balance higher than 10,000 points may result in a compensation rate of 10 cents per point and a point balance higher than 50,000 points may result in a compensation rate of 12 cents per point. Or vice versa, a lower quantity of points in the point balance may result in a higher compensation rate during settlement. For example, a point balance higher than 50,000 points may result in a compensation rate of 10 cents per point and a point balance higher than 10,000 points may result in a compensation rate of 12 cents per point. In some embodiments, the point settlement rules in the registry of point settlement rules may be based on the time period when the points are settled. For example, points settled during the first week of January will receive a higher compensation rate than the compensation rate received the last week of December. In some embodiments, the point settlement rules in the registry of point settlement rules may be based on the priority level of the merchant. For example, a merchant associated with a higher priority level may receive a higher compensation rate than a merchant with a lower priority level.

At step 1106, the merchant smart contract may detect transactions associated with the merchant digital wallet in the distributed ledger. The transactions may indicate a number of points transferred to the merchant digital wallet by a consumer digital wallet in exchange of goods and services offered by the merchant. The smart contract may identify the transactions by identifying transactions associated with the private key of the merchant digital wallet. The merchant digital wallet can encrypt the transactions with its private key to gain ownership of the transferred points. The smart contract may update the point balance based on the transferred points in the detected transactions.

At step 1108, the merchant smart contract may check if requirements to settle points are satisfied. In some embodiments, the registry of point settlements rules may maintain the requirements that need to be satisfied to initiate settlement. In some embodiments, the requirements may be that a settlement takes place after a period of time following the last settlement made by the smart contract and the registry of point settlements may indicate the frequency at which the settlements can take place. The frequency can be daily, weekly, biweekly, monthly, quarterly, biannual, annual or any timeframe determined by the organization or merchant digital wallet. In some embodiments, the requirements may be that a settlement takes place after the point balance is higher than a predetermined number. For example, the point balance may need to higher than 100,000 points in order for the smart contract to initiate the settlement. In some embodiments, the requirements may be that a settlement takes place when a compensation rate higher than a predetermined compensation rate can be achieved. For example, the compensation rate may need to be higher than 15 cents per points in order for the smart contract to initiate the settlement. In some embodiments, the smart contract may check if a combination of requirements has been satisfied. For example, the point balance of the merchant digital wallet is higher than 100,000 points, and the point balance has not been settled in the last week. If the requirements for settling the points are not satisfied, step 1108 may be repeated.

At step 1110, if requirements to settle points are satisfied, the merchant smart contract may settle the point by executing transactions to transfer points in the point balance to a digital wallet of the organization managing the reward system and receive monetary compensation in exchange for the points. The compensation rate for the exchange of points between the merchant digital wallet and the digital wallet of the organization may be based on the point settlement rules in the registry of point settlement rules.

Recommendation Engine

Figure 12:
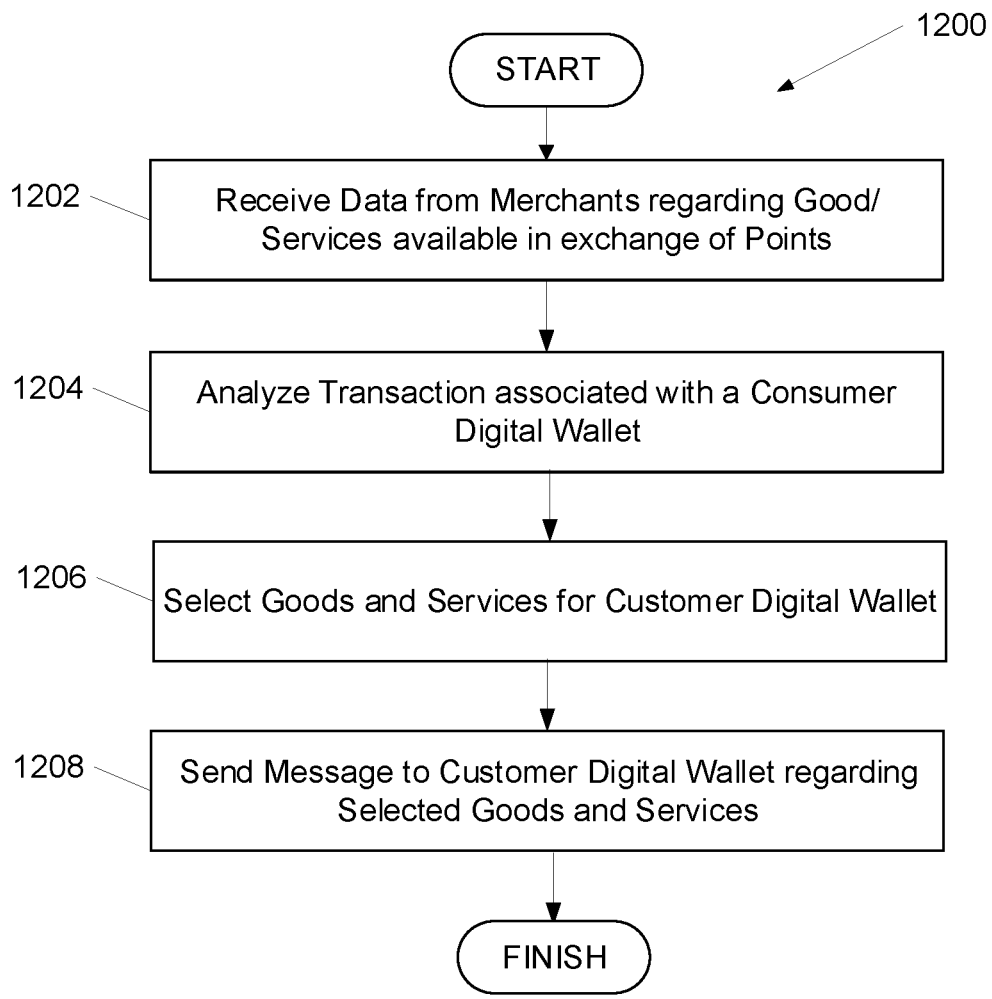
FIG. 12 shows a flowchart of recommending goods and services to consumers based transactions associated with consumer digital wallets according to one or more aspects of the disclosure.

FIG. 12 shows a flowchart 1200 of recommending goods and services to consumers by a recommendation engine based transactions associated with consumer digital wallets according to one or more aspects of the disclosure. Some or all of the steps of the flowchart 1200 may be performed using by one or more computing devices as described herein. In some embodiments, the actions in the flowchart may be performed in different orders and with different, fewer, or additional actions than those illustrated in FIG. 12. Actions may be combined and/or divided into sub-actions in some implementations.

A recommendation engine may recommend goods and services from merchants on an individualized basis to participating consumers of the reward system. The recommendation engine may create an individualized history for a participating consumer based on the transactions executed by the customer. The transactions may include in-store and/or online purchases made by the consumer. The purchase history of the consumer may be compiled by analyzing the transactions associated with the consumer digital wallet of the consumer in the distributed ledger. A consumer may receive a message from the recommendation engine with personalized recommendations.

For example, the recommendation engine may identify certain consumers that have a high potential to purchase a Starbucks gift card with points by analyzing the transactions in the distributed ledger. The recommendation engine may determine that such consumers spend much more in coffee shops than at other merchants. The recommendation engine may target such consumers with advertisements for Starbuck gifts with more vigor so as to capture more of the consumers' business. In some implementations, such insight may be provided proactively using the transactions associated with the consumers' digital wallet so that the recommendation engine may launch an advertising campaign for Starbucks gift cards aimed at such consumers.

The flowchart 1200 begins at step 1202, where a recommendation engine may receive information regarding goods and services available for the consumers in exchange of points earned by the consumers. The information may be received from the plurality of participating merchants. The information may also be received from the organization managing the reward system. Each of the goods and services will be associated with a price in points. Examples of goods may include gift cards from various merchants, coffee mugs, backpacks, discounts available at merchants, etc. Example of services may include free airline tickets, free rentals cars, free oil change, etc.

At step 1204, the recommendation engine analyzes the transactions in the distributed ledgers in the distributed network. The recommendation engine may comprise machine learning-based models that are trained on the transactions in the distributed ledger to generate individualized histories of one or more participating consumers of the reward system. Examples of machine learning-based models include logistic regression-based models, convolutional neural network-based models, recurrent neural network-based models (e.g., models that use long short-term memory networks or gated recurrent units), fully-connected network-based models, and multilayer perceptron-based models. The transactions in the distributed ledger may comprise of online and in-store purchases executed by the consumer digital wallet of the consumers.

The goods and services associated with the transactions may be categorized into different category groups using common identity resolution and product taxonomy by the machine learned-based models. An example analysis period may be a year, a month, or a week. An example machine learned-based model may comprise one or more recurrent neural networks (RNNs) made up of long short-term memory (LSTM) blocks. An LSTM network may selectively "remember" information over arbitrary intervals of time. This property may make the LSTM network a powerful classifier when used to determine consumer purchase history and interest. For example, the LSTM network may be used to determine the interest of a consumer in a free Starbucks gift card. The transactions associated with the digital wallet of the consumer may indicate frequent visits to coffee shops.

At step 1206, the trained machine learned-based models of the recommendation engine determine goods and services that can be recommended to the consumer. The recommendation engine may use the information received at step 1202 and the determined consumer purchase history and interest at step 1204 to determine the recommendation. The recommendation engine may use additional information during the determination, such as gender of the consumer (i.e., the consumer is male or female), age group of the consumer, geographic location of the consumer, point balance of the consumer, and point elasticity context (i.e., number of points does that consumer generally redeem). The recommendation engine then determines personalized recommendations for the consumer.

At step 1208, the recommendation engine may send a message to the consumer. The recommendation engine may send the message through the digital wallet of the consumer. The recommendation engine may store contact information of the consumer (e.g., address, phone number, email addresses, MAC addresses, IP addresses, etc.), and may use the contact information to send a message to the consumer. Informing the consumer by sending messages regarding goods and services of high interest to the consumer may encourage the consumer to redeem points in his point balance before they expire. Receiving a personalized recommendation from the recommendation engine may encourage the consumer to earn more points and redeem the earned points for goods and services the recommendation engine deems to have potential high interest to the consumer.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is, therefore, to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method, comprising:
   generating, by a node in a blockchain network, a plurality of merchant smart contracts by generating, for each of a plurality of merchants, one or more corresponding smart contracts, wherein generating the plurality of merchant smart contracts comprises, for a first merchant smart contract of the plurality of merchant smart contracts:
      storing, by the node, a first point balance associated with a first merchant digital wallet of a plurality of merchant digital wallets;
      retrieving, from a database of rules for compensation rates, a plurality of point settlement rules, wherein each of the plurality of point settlement rules specifies a corresponding compensation rate; and
      selecting a first subset of the plurality of point settlement rules based on a first priority level assigned to the first merchant digital wallet and a first merchant size associated with a first merchant corresponding to the first merchant digital wallet;
      storing, by the node, an association between the first subset of the plurality of point settlement rules and the first merchant smart contract;
   upon execution, by the node, of instructions of the first merchant smart contract:
      settling, by the node, at least a portion of the first point balance associated with the first merchant digital wallet with one or more digital wallets of an organization managing a reward system by:
         executing one or more blockchain transactions based on one or more first compensation rates indicated by the first subset of the plurality of point settlement rules and based on a determination that the first point balance satisfies one or more point settlement rules in the first subset of the plurality of point settlement rules;
   generating, by the node, a plurality of consumer smart contracts by generating, for each of a plurality of consumers, one or more corresponding consumer smart contracts, wherein generating the plurality of consumer smart contracts comprises, for each consumer smart contract of the plurality of consumer smart contracts:
      storing, by the node, a point balance associated with a consumer digital wallet of a plurality of consumer digital wallets;
      determining one or more incentive programs associated with the consumer digital wallet;
      retrieving, from a database of point earning rules, a plurality of point earning rules, wherein each of the plurality of point earning rules is classified based on incentive programs, and wherein one or more of the plurality of point earning rules specify a point expiration date;
      selecting a subset of the plurality of point earning rules based on the one or more incentive programs associated with the consumer digital wallet; and
      associating, by the node and based on the subset of the plurality of point earning rules, each point in the point balance associated with the consumer digital wallet with a respective expiration date; and
   upon execution, by the node, of instructions of a first consumer smart contract that corresponds to a first consumer digital wallet of the plurality of consumer digital wallets:
      identifying, by the node from the blockchain network, a first blockchain transaction associated with the first consumer digital wallet;
      generating, by the node, points based on:
         a first subset of the plurality of point earning rules associated with the first consumer digital wallet, and
         the first blockchain transaction;
      executing, by the node, a second blockchain transaction transferring the generated points to the first consumer digital wallet; and
      updating, by the node and based on the executed second blockchain transaction, a first point balance associated with the first consumer digital wallet.

2. The method of claim 1, wherein one or more merchant digital wallets of the plurality of merchant digital wallets are stored on nodes of the blockchain network.

3. The method of claim 1, wherein a group of consumer digital wallets comprise the first consumer digital wallet and one or more other consumer digital wallets of the plurality of consumer digital wallets; and
wherein upon execution, by the node, of further instructions of the first consumer smart contract, the method further comprises:
determining a group point balance of the group by summing point balances of the first consumer digital wallet and the one or more other consumer digital wallets.

4. The method of claim 1, wherein the selecting the subset of the plurality of point settlement rules comprises determining a subset of the plurality of point settlement rules based on the priority level associated with the merchant digital wallet.

5. The method of claim 1, wherein settling at least the portion of the first point balance comprises settling the at least the portion of the first point balance on a periodic basis.

6. The method of claim 1, wherein, upon execution, by the node, of further instructions of the first consumer smart contract, the method further comprises:
receiving, from the first consumer digital wallet, data comprising an indication to execute a third blockchain transaction; and
determining that the first point balance satisfies a threshold; and
executing the third blockchain transaction.

7. The method of claim 1, wherein at least one of the plurality of point settlement rules is based on the first point balance.

8. The method of claim 1, wherein a first point earning rule of the plurality of point earning rules is based on a first time period, wherein a second point earning rule of the plurality of point earning rules is based on a second time period, and wherein the first point earning rule is different than the second point earning rule.

9. The method of claim 1, further comprising:
identifying, in the blockchain network, blockchain transactions associated with the first consumer digital wallet;
generating, based on the identified blockchain transactions, an individualized history for the first consumer digital wallet; and
sending, based on the generated individualized history, one or more messages to the first consumer digital wallet.

10. The method of claim 1, wherein upon execution, by the node, of further instructions of the first consumer smart contract, the method further comprises:
sending, based on expiration dates of one or more points in the first point balance, one or more messages to the first consumer digital wallet.

11. A computing device configured to operate as a node in a blockchain network, the computing device comprising:
one or more processors; and
memory storing instructions that, when executed by the one or more processors, cause the computing device to:
generate a plurality of merchant smart contracts by generating, for each of a plurality of merchants, one or more corresponding smart contracts, wherein generating the plurality of merchant smart contracts comprises, for a first merchant smart contract of the plurality of merchant smart contracts:
storing, by the node, a first point balance associated with a first merchant digital wallet of a plurality of merchant digital wallets;
retrieving, from a database of rules for compensation rates, a plurality of point settlement rules, wherein each of the plurality of point settlement rules specifies a corresponding compensation rate; and
selecting a first subset of the plurality of point settlement rules based on a first priority level assigned to the first merchant digital wallet and a first merchant size associated with a first merchant corresponding to the first merchant digital wallet;
store an association between the first subset of the plurality of point settlement rules and the first merchant smart contract;
upon execution of instructions of the first merchant smart contract:
settle at least a portion of the first point balance associated with the first merchant digital wallet with one or more digital wallets of an organization managing a reward system by:
executing one or more blockchain transactions based on one or more first compensation rates indicated by the first subset of the plurality of point settlement rules and based on a determination that the first point balance satisfies one or more point settlement rules in the first subset of the plurality of point settlement rules;
generate a plurality of consumer smart contracts by generating, for each of a plurality of consumers, one or more corresponding consumer smart contracts, wherein generating the plurality of consumer smart contracts comprises, for each consumer smart contract of the plurality of consumer smart contracts:
store a point balance associated with a consumer digital wallet of a plurality of consumer digital wallets;
determining one or more incentive programs associated with the consumer digital wallet;
retrieving, from a database of point earning rules, a plurality of point earning rules, wherein each of the plurality of point earning rules is classified based on incentive programs, and wherein one or more of the plurality of point earning rules specify a point expiration date;
selecting a subset of the plurality of point earning rules based on the one or more incentive programs associated with the consumer digital wallet; and
associating, based on the subset of the plurality of point earning rules, each point in the point balance associated with the consumer digital wallet with a respective expiration date; and
upon execution of instructions of a first consumer smart contract that corresponds to a first consumer digital wallet of the plurality of consumer digital wallets:
identify, by the node from the blockchain network, a first blockchain transaction associated with the first consumer digital wallet;
generate, by the node, points based on:
a first subset of the plurality of point earning rules associated with the first consumer digital wallet, and
the first blockchain transaction;
execute a second blockchain transaction transferring the generated points to the first consumer digital wallet; and
update, based on the executed second blockchain transaction, a first point balance associated with the first consumer digital wallet.

12. The computing device of claim 11, wherein one or more merchant digital wallets of the plurality of merchant digital wallets are stored on nodes of the blockchain network.

13. The computing device of claim 11, wherein a group of consumer digital wallets comprise the first consumer digital wallet and one or more other consumer digital wallets of the plurality of consumer digital wallets; and
   wherein the instructions, when executed by the one or more processors, further cause the computing device to, upon execution of further instructions of the first consumer smart contract:
      determine a group point balance of the group by summing point balances of the first consumer digital wallet and the one or more other consumer digital wallets.

14. The computing device of claim 11, wherein the instructions, when executed by the one or more processors, cause the computing device to select the subset of the plurality of point settlement rules by causing the computing device to determine the subset of the plurality of point settlement rules based on the priority level associated with the merchant digital wallet.

15. The computing device of claim 11, wherein the instructions, when executed by the one or more processors, cause the computing device to settle at least the portion of the first point balance by causing the computing device to settle the at least the portion of the first point balance on a periodic basis.

16. One or more non-transitory computer-readable media storing instructions that, when executed by one or more processors of a computing device configured to operate as a node in a blockchain network, cause the computing device to:
   generate a plurality of merchant smart contracts by generating, for each of a plurality of merchants, one or more corresponding smart contracts, wherein generating the plurality of merchant smart contracts comprises, for a first merchant smart contract of the plurality of merchant smart contracts:
      storing, by the node, a first point balance associated with a first merchant digital wallet of a plurality of merchant digital wallets;
      retrieving, from a database of rules for compensation rates, a plurality of point settlement rules, wherein each of the plurality of point settlement rules specifies a corresponding compensation rate; and
      selecting a first subset of the plurality of point settlement rules based on a first priority level assigned to the first merchant digital wallet and a first merchant size associated with a first merchant corresponding to the first merchant digital wallet;
   store an association between the first subset of the plurality of point settlement rules and the first merchant smart contract;
   upon execution of instructions of the first merchant smart contract:
      settle at least a portion of the first point balance associated with the first merchant digital wallet with one or more digital wallets of an organization managing a reward system by:
         executing one or more blockchain transactions based on one or more first compensation rates indicated by the first subset of the plurality of point settlement rules and based on a determination that the first point balance satisfies one or more point settlement rules in the first subset of the plurality of point settlement rules;
   generate a plurality of consumer smart contracts by generating, for each of a plurality of consumers, one or more corresponding consumer smart contracts, wherein generating the plurality of consumer smart contracts comprises, for each consumer smart contract of the plurality of consumer smart contracts:
      store a point balance associated with a consumer digital wallet of a plurality of consumer digital wallets;
      determining one or more incentive programs associated with the consumer digital wallet;
      retrieving, from a database of point earning rules, a plurality of point earning rules, wherein each of the plurality of point earning rules is classified based on incentive programs, and wherein one or more of the plurality of point earning rules specify a point expiration date;
      selecting a subset of the plurality of point earning rules based on the one or more incentive programs associated with the consumer digital wallet; and
      associating, based on the subset of the plurality of point earning rules, each point in the point balance associated with the consumer digital wallet with a respective expiration date; and
   upon execution of instructions of a first consumer smart contract that corresponds to a first consumer digital wallet of the plurality of consumer digital wallets:
      identify, by the node from the blockchain network, a first blockchain transaction associated with the first consumer digital wallet;
      generate, by the node, points based on:
         a first subset of the plurality of point earning rules associated with the first consumer digital wallet, and
         the first blockchain transaction;
      execute a second blockchain transaction transferring the generated points to the first consumer digital wallet; and
      update, based on the executed second blockchain transaction, a first point balance associated with the first consumer digital wallet.

17. The one or more non-transitory computer-readable media of claim 16, wherein one or more merchant digital wallets of the plurality of merchant digital wallets are stored on nodes of the blockchain network.

18. The one or more non-transitory computer-readable media of claim 16, wherein a group of consumer digital wallets comprise the first consumer digital wallet and one or more other consumer digital wallets of the plurality of consumer digital wallets; and
   wherein the instructions, when executed by the one or more processors, further cause the computing device to, upon execution of further instructions of the first consumer smart contract:
      determine a group point balance of the group by summing point balances of the first consumer digital wallet and the one or more other consumer digital wallets.

19. The one or more non-transitory computer-readable media of claim 16, wherein the instructions, when executed by the one or more processors, cause the computing device to select the subset of the plurality of point settlement rules by causing the computing device to determine the subset of the plurality of point settlement rules based on the priority level associated with the merchant digital wallet.

20. The one or more non-transitory computer-readable media of claim 16, wherein the instructions, when executed by the one or more processors, cause the computing device to settle at least the portion of the first point balance by causing the computing device to settle the at least the portion of the first point balance on a periodic basis.

\* \* \* \* \*